(12) United States Patent
Souza

(10) Patent No.: US 9,160,259 B2
(45) Date of Patent: Oct. 13, 2015

(54) START AND CONTROL METHOD FOR A SINGLE-PHASE INDUCTION MOTOR, A START AND CONTROL SYSTEM FOR A SINGLE-PHASE INDUCTION MOTOR AND AN ELECTRONIC START AND CONTROL DEVICE APPLIED TO A SINGLE-PHASE INDUCTION MOTOR

(75) Inventor: Marcos Roberto de Souza, Joinville (BR)

(73) Assignee: Whirlpool S.A., Sao Paulo (BR)

( * ) Notice: Subject to any disclaimer, the term of this patent is extended or adjusted under 35 U.S.C. 154(b) by 199 days.

(21) Appl. No.: 13/825,261

(22) PCT Filed: Sep. 19, 2011

(86) PCT No.: PCT/BR2011/000329
§ 371 (c)(1),
(2), (4) Date: May 30, 2013

(87) PCT Pub. No.: WO2012/037624
PCT Pub. Date: Mar. 29, 2012

(65) Prior Publication Data
US 2013/0264991 A1   Oct. 10, 2013

(30) Foreign Application Priority Data

Sep. 20, 2010   (BR) ..................................... 1003594

(51) Int. Cl.
*H02P 1/26* (2006.01)
*H02P 1/42* (2006.01)
(Continued)

(52) U.S. Cl.
CPC .. *H02P 1/42* (2013.01); *H02P 1/44* (2013.01); *H02P 25/04* (2013.01)

(58) Field of Classification Search
USPC .................... 318/727, 774, 778, 785, 400.01, 318/400.14, 400.1, 700, 701, 799, 800, 801, 318/432; 388/800, 808, 843
See application file for complete search history.

(56) References Cited

U.S. PATENT DOCUMENTS

| 4,605,888 A | 8/1986 | Kim |
| 4,804,901 A * | 2/1989 | Pertessis et al. ............. 318/786 |

(Continued)

FOREIGN PATENT DOCUMENTS

| DE | 10 2008 056 577 | 11/2008 |
| WO | WO 02/09264 | 1/2002 |
| WO | WO 2010/052137 | 5/2010 |

OTHER PUBLICATIONS

International Search Report mailed Nov. 28, 2012 for International Application No. PCT/BR2011/000329.

(Continued)

*Primary Examiner* — Antony M Paul
(74) *Attorney, Agent, or Firm* — Fay Sharpe LLP

(57) ABSTRACT

The present invention relates to a method, a system and an electronic device (15), especially designed for start and control of the functioning of a single-phase induction motor (12). Said motor (12) comprises a run winding (10) and a start winding (11), the start winding (11) is electrically associated to an electronic start device (15), the run winding (10) and the electronic start device (15) are electrically associated to an alternating voltage source (F) configured to supply feed energy to the motor (12), the start winding (11) is kept de-energized at a first operation instant (Top1) of the motor (12). More particularly, the present invention is configured to energize the start winding (11) through the electronic start device (15) in the condition in which a first voltage signal (Vsamp1), sampled from the alternating voltage source (F), through a sensor element (7), is lower than or equal to a first voltage reference (V1), or higher than or equal to a second voltage reference (V2), so as to initiate a start period of the motor (12).

15 Claims, 2 Drawing Sheets

(51) Int. Cl.
*H02P 1/44* (2006.01)
*H02P 25/04* (2006.01)

(56) References Cited

U.S. PATENT DOCUMENTS

| | | |
|---|---|---|
| 5,051,681 A | 9/1991 | Schwarz |
| 5,053,908 A | 10/1991 | Cooper et al. |
| 5,528,120 A * | 6/1996 | Brodetsky ............... 318/785 |
| 6,320,348 B1 * | 11/2001 | Kadah ............... 318/785 |
| 6,982,539 B1 * | 1/2006 | Ward ............... 318/778 |
| 7,777,438 B2 * | 8/2010 | Schmidt et al. ............... 318/430 |
| 8,378,619 B2 * | 2/2013 | Hancock et al. ............... 318/786 |
| 2008/0018293 A1 | 1/2008 | Schmidt et al. |

OTHER PUBLICATIONS

Written Opinion mailed Nov. 28, 2012 for International Application No. PCT/BR2011/000329.

* cited by examiner

START AND CONTROL METHOD FOR A SINGLE-PHASE INDUCTION MOTOR, A START AND CONTROL SYSTEM FOR A SINGLE-PHASE INDUCTION MOTOR AND AN ELECTRONIC START AND CONTROL DEVICE APPLIED TO A SINGLE-PHASE INDUCTION MOTOR

The present invention relates to a method, a system and an electronic device, especially designed for the improved start and control of the functioning of a single-phase induction motor.

DESCRIPTION OF THE PRIOR ART

It is known that single-phase induction motors are widely used at present by virtue of their simplicity, robustness and high performance. The find application in household appliances in general, such refrigerators, freezers, air-conditioners, hermetic compressors, washing machines, motor-pumps, fans and a few industrial applications.

These types of engines are usually provided with a cage-type rotor and a coiled stator constituted by two windings, one of which being a running winding and the other being a start winding.

During normal operation of the compressor, the running winding is fed by an alternating voltage, the start winding being fed temporarily, in the beginning of the start operation, thus creating a magnetic field around the stator gap, so as to provide the whole condition required to accelerate the rotor and promote the start.

The spinning magnetic field can be obtained by feeding the star coil with a time-dephased current with respect to the current circulating through the main winding, preferably at an angle of 90 degrees. This phase-lagging between the current circulating through the two windings is obtained by means of constructive characteristics of the windings or by installing an external impedance in series with one of the windings, but generally in series with the start winding.

This value of the current circulating through the start winding during the motor start process is generally high, and it is necessary to use some type of switch to interrupt this current after the time required to accelerate the motor has passed.

For motors from which high efficiency is required, this start winding is not totally turned off after the start period has passed. A capacitor called running capacitor remains connected in series with this winding, said running capacitor providing a current sufficient to increase the maximum torque of the motor and its efficiency.

For motors with this configuration, using a permanent impedance in series with the start winding during normal operation of the motor, a few start devices are known from the prior art, of types PCT, electromechanical relay, temporizers or still there are combinations in which a PTC connected in series with the device that interrupts the passages of current after a predetermined time (RSP), as cited in patent documents U.S. Pat. No. 5,053,908 and U.S. Pat. No. 5,051,681, and in document WO02/09264A1, of the same applicant.

One of the components that are widely used at the start of split-phase single-phase motors, wherein the run capacitor is not used, is the electronic-relay type.

The extent of its use is related to its low manufacture cost and its technological simplicity. On the other hand, the electronic relay presents a number of limitations, with the need to size a specific component for each size of electric motor, which makes it impossible to use it on high-efficiency motors where a run capacitor is employed, which generates electromagnetic and sound noises during its operation and wear of its components caused by electric arc and mechanical friction.

An alternative to the electronic relay is the PTC (positive coefficient temperature) type device. This component is widely used on high-efficiency motors where its application is associated to a run capacitor. Since this is a ceramic tablet without moveable parts, its principle overcomes a great part of the limitations of the electromagnetic relay.

Since the functioning thereof is based on heating a ceramic tablet, which results in raising its resistance and the consequent limitation of the circulating current, there is dissipation of a residual power throughout the functioning period. Another limitation of this component is related to the interval time required to enable consecutive starts.

One of its great advantages is the possibility of using a single component to operate at the start of a family of motors with a determined voltage (115V or 220V), but this becomes a limitation when the characteristic analyzed is the optimization of the time of energizing the auxiliary winding.

Its conduction time is directly proportional to the volume of the ceramic tablet and inversely proportional to the circulating current, which entails a reduced starting time when it is applied to motors having higher power and a too long time when it is applied to smaller motors. These two factors lead to starting deficiency of larger motors and a higher consumption of energy during the starting period in smaller motors.

On the other hand, the temporizer-type starting components eliminate the great disadvantage of residual consumption of the PTC, but do not enable one to adapt the starting time required for different motor sizes. Their concept does not enable one to size a circuit that could provide optimized starting time for the different motor sizes, and so the existence of various models become necessary, each of them adjusted for a determined actuation time, so as to meet a determined family of electric motors, which will cause lack of standardization, much adjustment at the manufacture lines and increase ion stocks.

Such devices do not take into consideration the operation conditions at the starting moment, and so they are sized by the worst condition, thus prolonging the starting time.

In the face of the foregoing, one proposes the present invention with a view to provide a starting method, system and device for a single-phase induction motor, in order to provide a simple and secure technological solution, with a reduced cost with respect to the existing techniques, thus enabling the use thereof on a large scale for low-cost systems, and further exhibiting the advantages of the temporized devices in which the residual consumption of power is negligible.

OBJECTIVES OF THE INVENTION

A first objective of the present invention is to propose a starting method for a single-phase induction motor, configured to actuate said motor from reference voltage values that are previously defined on an electronic starting device.

A second objective of the present invention is to provide a starting system and an electronic starting device having simple, robust and low cost as compared with the solutions available at present.

An additional objective of the present invention is to provide a technological solution capable of reducing the number of components required serve a determined family of motors within the same feed voltage.

Additionally, another objective of the invention is to apply the present starting system to high-efficiency motors that make use of run capacitors, having the characteristic of the electromechanical relays, wherein the starting time is optimized for each different size of the electric motor.

A further objective of the present invention is to provide an electronic starting device for a single-phase induction motor with negligible energy consumption.

It is still another objective of the present invention to provide a starting device capable of operating in conjunction with a starting capacitor, or another impedance installed ion series with the starting winding of the motor.

On the other hand, it is an additional objective of the invention to provide an electronic starting device that is not susceptible to transients or disturbances coming from the feed network.

Finally, it is another objective of the invention to provide a starting device for a single-phase motor, capable of operating in conjunction with the arrangement of some cooling systems, which are provided with an impedance connected to the single-phase induction motor.

BRIEF DESCRIPTION OF THE INVENTION

A way to achieve the objectives of the present invention is by providing a starting method and control for a single-phase induction motor, the motor comprising a run winding and a start winding, the start winding being electrically associated to an electronic start device, the run winding and the electronic start device being electrically associated to a source of alternating voltage configured to supply feed power to the motor, the start winding being kept de-energized at a first instant of operation of the motor, the method comprising the following steps:

a) sampling, through the start device, a first voltage signal from the source of alternating voltage, to the motor in non-running condition;

b) comparing the first voltage signal shown in item "a" with a first voltage reference and with a second voltage reference that are pre-adjusted inwardly of the start device;

c) if the comparison of item "b" indicates that the voltage signal is lower than or equal to the first voltage reference, or higher than or equal to the second voltage reference, then the electronic start device energizes the start winding so as to initiate a starting period of the single-phase induction motor;

d) counting the starting time of the motor, through the electronic start device, after energizing the start winding;

e) if the starting time counted at step "d" reaches a pre-established start time value, then de-energize the start winding through the electronic start device, so as to finish the start time of the single-phase induction motor.

A second way to achieve the objectives of the invention is by providing a start system and control for a single-phase induction motor, the motor comprising a run winding and a start winding, the start winding being electrically associated to an electronic start device, the run winding and the electronic start device being electrically associated to a source of alternating voltage configured to supply feed power to the motor, the system being configured to energize the start winding through the electronic start device, on the condition in which the fist voltage signal, shown from the source of alternating voltage through the electronic start device, is lower than or equal to a first voltage reference, or higher than or equal to a second voltage reference, so as to initiate a motor starting period.

A third way to achieve the objectives of the present invention is by providing an electronic start device and control applied to a single-phase induction motor fed by a source of voltage, the device comprising at least one start switch electrically associated to a start winding of the motor, the electronic device being configured to command the start switch so as to energize the start winding, in the condition in which a first voltage signal, shown from the source of alternating voltage, is lower than or equal to a first voltage reference, or higher than or equal to a second voltage reference, so as to initiate a motor starting period.

BRIEF DESCRIPTION OF THE DRAWINGS

The present invention will now be described in greater detail with reference to the attached drawings, in which.

DETAILED DESCRIPTION OF THE FIGURES

As already mentioned before, the present invention is intended to improve the start of a single-phase induction motor 12.

Within the teachings of the present invention, one proposes a method for starting and controlling a single-phase induction motor 12.

Figure 1:
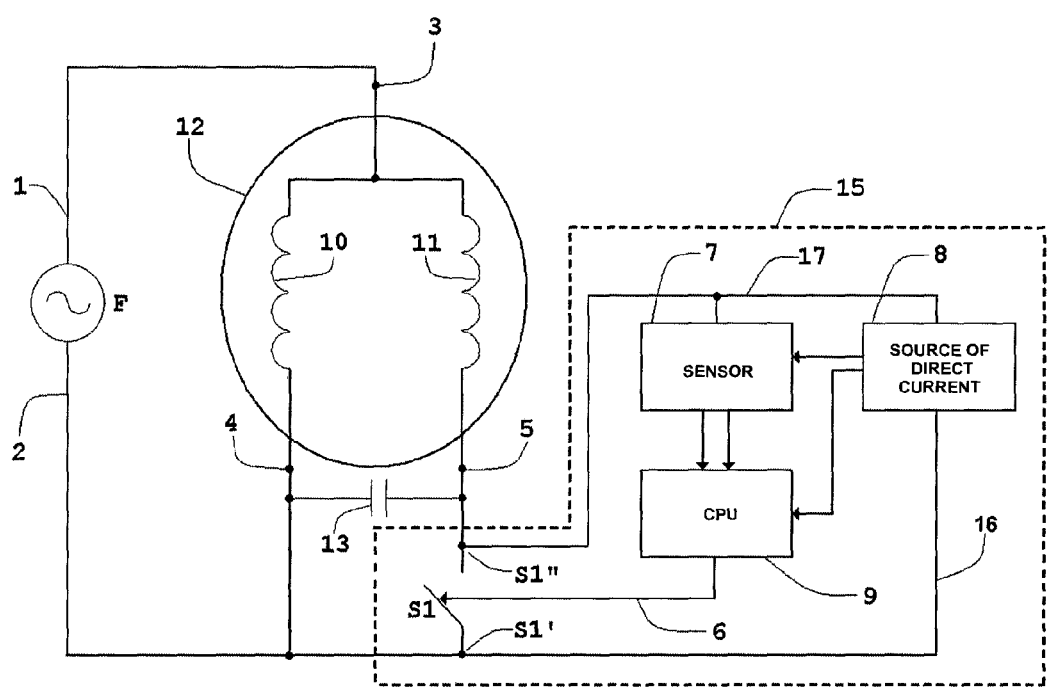
FIG. 1 represents a schematic view of the start system for a single-phase motor, according to the teachings of the present invention.

Said motor 12, as shown in FIG. 1, comprises a run winding 10 and a start winding 11, this start winding 11 being electrically associated to an electronic start device 15.

The run winding 10 and the electronic start device 15 are electrically associated to a source of alternating voltage F, the latter being configured to supply electric energy to the motor 12. Such preferred embodiment is shown in FIG. 1.

According to the actuation methodology foreseen in the invention, the start winding 11 is kept de-energized at a first instant of operation Top1 of the motor 12.

In greater detail, the present method comprises the following steps:

a) sampling, through the electronic start device 15, a first voltage signal Vsamp1 from the source of alternating voltage F, to the motor 12 in non-running condition;

b) comparing the first voltage signal Vsamp1 sampled at step "a" with a first voltage reference V1 and with a second voltage reference V2, which are pre-adjusted inside the electronic start device 15;

c) if the comparison of step "b" indicates that the voltage signal Vsamp is lower than or equal to the first voltage reference V1, or higher or equal to the second voltage reference V2, then the electronic start device 15 energizes the start winding 11, so as to initiate a starting period of the single-phase induction motor 12;

d) counting a start time Tp of the motor 12, through the electronic start device 15, after energizing the start winding 11, and e) if the start time Tp counted at step "d" reaches a pre-established start time value Tpest, then de-energize the start winding 11 through the electronic start device 15, so as to finish the start period of the single-phase induction motor 12.

The above-described steps promote the start of the single-phase motor 12, according to the teachings of the invention.

Additionally, it should be pointed out that the presently proposed method further comprises the following steps:

f) sampling, through the electronic start device 15, a second voltage signal Vsamp2 from the voltage source F, to the motor 12 in non-running condition;

g) comparing the second voltage signal Vsamp2 sampled at step "f" with the first voltage reference V1 and with the second voltage reference V2;

h) determining, on the basis of the comparison of step "g", if the motor 12 is decelerated, or in nun-functioning condition by total or partial interruption of the feed voltage supplied by the source of voltage F;

i) if the motor 12 is in non-functioning condition, then carry out the steps "a" to "e" again.

According to the teachings of the present invention, it is worthwhile to point out that the electronic start device 15 is kept in a power-saving mode in case the first and second voltage signals Vsamp1, Vsamp2 are between the first and second voltage references V1, V2.

Figure 2:
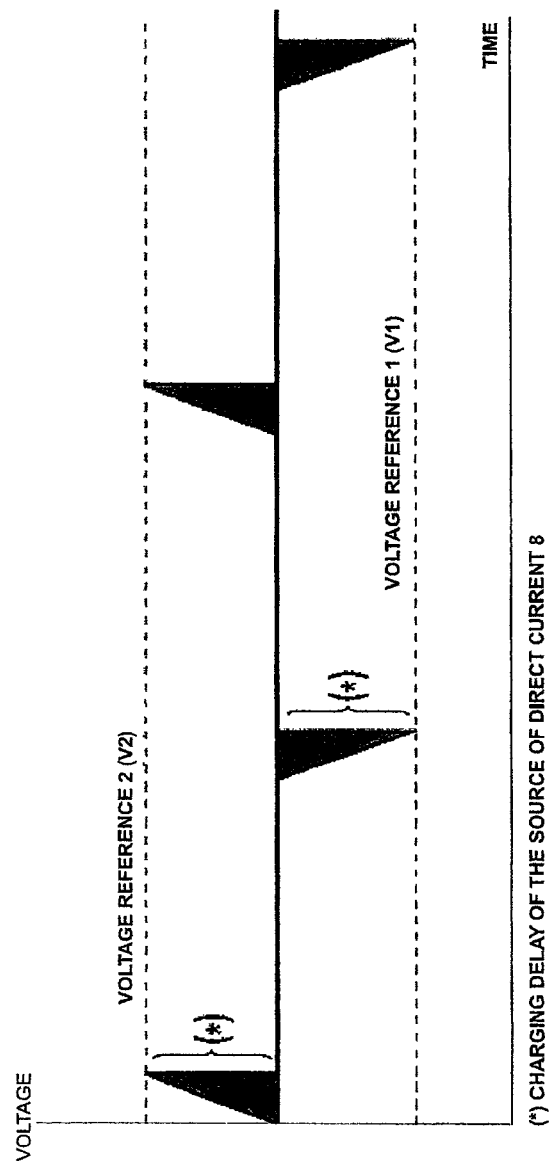
FIG. 2 illustrates the wave form on the start switch S1 during the starting period of the single-phase motor.

With regard to the voltage references employed, as shown in FIG. 2, the proposed starting and controlling methodology takes into account the fact that the first and the second voltage references V1, V2 are pre-adjusted in a minimum operation condition OPmin, capable of keeping the electric voltage level from an internal direct-current source 8 to the start device 15. FIG. 1 shows, in greater detail, said direct-current source 8 and other components that constitute the assembly of the proposed object.

Said minimum operation condition OPmin is established so that the first and the second voltage signals Vsamp1, Vsamp2 will be equal to the first voltage reference V1 or to the second voltage reference V2, only if the source of voltage F supplies an electric voltage capable of keeping the level of voltage of the source of direct current 8.

It should be pointed out that the first and the second voltage references V1 and V2 are established or adjusted in such a way, that at every half-cycle of the voltage from the source F a new charge will be given at the source of direct current 8.

As to the start period of the motor 12, it is calculated from a source frequency Freqf of the voltage source F.

An additional and innovatory characteristic of the present invention refers to the start and control system for a single-phase induction motor 12, as conceived and shown in FIG. 1.

This system evidently takes into account the fact that the motor 12 comprises, as already said, a run winding 10 and a start winding 11.

The same figure further shows that the start winding 11 is electrically associated to an electronic start device 15, while the run winding 10 and the electronic start device 15 are electrically associated to the already mentioned alternating-voltage source F.

In the context of the operation of the present system, the source F is configured for the purpose of supplying the electric energy necessary to the motor 12 after the start thereof, besides serving as a reference for the machine-starting procedure itself.

In a quite novel manner as compared with the known techniques, the proposed start system is configured to energize the start winding 11 through the electronic start device 15 in the condition in which the first voltage signal Vsamp1, shown from the alternating voltage source F through the sensor element 7, is lower than or equal to a first voltage reference V1, or higher than or equal to a second voltage reference V2, so as to initiate a start period of the motor 12. The sensor element 7 is electrically associated to a signal processing unit 9, as shown in FIG. 1. Both devices, sensor element 7 and processing unit, are configured inwardly of the electronic start device 15.

Thus, the first and second voltage references V1, V2 are preadjusted at the electronic start device 15, through the signal processing unit 9. It should be further mentioned that the first and the second voltage references V1, V2 are adjusted so that, at every half-cycle of the voltage from the voltage source F, a new charge will be added to the direct-current source 8.

As already mentioned before for the proposed start methodology, the system takes into account the fact that the signal processing unit 9 functions in an energy-saving operation at the moment when the voltage from the direct-current source 8 is established.

At the instant of the start of the single-phase motor 12, that is, when energizing the start winding 11, the signal processing unit comes out of the energy saving mode.

While still starting, the start winding 11 is de-energized after the start period has passed, this period being predetermined as a start time Tpest in the signal processing unit 9. In this case, this is an internal variable adjusted in the processing unit 9.

FIG. 1 further shows other details of the preferred embodiment of the present system. One observes, for instance, that the signal processing unit 9 is fed by said direct-current source 8, the latter being connected in parallel to a start switch S1.

Said switch S1 is in open condition, as shown in the same FIG. 1, at the beginning of supply of voltage by the alternating-voltage source F.

In addition, it should be pointed out that said start switch S1 is the element or device responsible for commanding the energization of the start winding 11, through an electric command generated for a determined control signal 6 of the switch S1 by the signal processing unit 9.

In a quite advantageous way as compared to the previous techniques, the presently claimed system enables one to evaluate the operation state of the single-phase motor 12, inasmuch as such a system is configured to sample, through the sensor element 7, a second voltage signal Vsamp2 from the voltage source F to the motor 12 in running condition, determining if said motor 12 is decelerated or turned off.

As an example, if a condition of total interruption of the energy supplied by the alternating-voltage source F is identified, then the electronic start device 15 is enabled for a second start of the motor 12, as soon as said voltage source F begins again to supply voltage.

Finally, one proposes with the present invention an electronic start and control device 15, applied to a single-phase induction motor 12, fed by a voltage source F.

Such a device 15 comprises, as shown in FIG. 1, at least one start switch S1 electrically associated to a start winding 11 of the motor 12, through a connection terminal 5.

The device 15 presents, preferably as compared with the prior art, the fact that it is configured to command the start switch S1, so as to energize the start winding 11, in the condition in which a first voltage signal Vsamp1, sampled from the alternating-voltage source F, is lower than or equal to a first voltage reference V1, or higher than or equal to a second voltage reference V2, in order to initiate a start period of said motor 12.

FIG. 1 further shows other details of electric connection between the components that constitute said start device 15. Such components are essentially a sensor element 7, a signal processing unit 9, the latter being formed by any type of processor or electronic microcontroller, and a direct-current source 8.

Such a source 8 is associated in parallel to the start switch S1 through the first and the second switch terminals S1', S1", while the sensor element 7 monitors levels of voltage on said switch S1, especially through the second switch terminal S1".

Thus, the start device 15 proposed now comprises at least one signal processing unit 9, fed by a direct-current source 8, and at least one sensor element 7 configured to measure the first voltage signal Vsamp1.

In an additional configuration of the present invention, the electronic start device 15 enables the use of a running capacitor 13, arranged in parallel between the terminal 4 and the connection terminal 5, respectively, associated to the runs and start windings 11, so as to provide the necessary time lag between the currents that pass through said windings during normal operation of the motor.

In the face of the foregoing, it should be pointed out that the presently claimed object achieves its objectives in as much as a start and control method, system and device for a single-phase motor 12 are proposed and conceived, so as to command said machine more efficiently, with lower cost and lower demand with regard to energy.

A preferred embodiment having been described, one should understand that the scope of the present invention embraces other possible variations, being limited only by the contents of the accompanying claims, which include the possible equivalents.

The invention claimed is:

1. A start and control method for a single-phase induction motor (12), the motor (12) comprising a run winding (10) and a start winding (11), the start winding (11) being electrically associated to an electronic start device (15), the run winding (10) and the electronic start device (15) being electrically associated to an alternating-voltage source (F) configured to supply feed power to the motor (12), the method comprising the following steps:
   a) sampling, through the start device (15), a first voltage signal (Vsamp1) from the alternating-voltage source (F) to the motor (12) in a non-running condition;
   b) comparing the first voltage signal (Vsamp1) sampled at step "a" with a first voltage reference (V1) and with a second voltage reference (V2) that are pre-adjusted in the start device (15);
   c) if the comparison of step "b" indicates that the voltage signal (Vsamp) is lower than or equal to the first voltage reference (V1), or higher than or equal to the second voltage reference (V2), then the electronic start device (15) energizes the start winding (11) so as to initiate a start period of the single-phase induction motor (12);
   d) counting a start time (Tp) of the motor (12), through the electronic start device (15), after energizing the start winding (11);
   e) if the start time (Tp) counted at step "d" reaches a pre-established start time value (Tpest), then de-energize the start winding (11), through the electronic start device (15), so as to finish the start period of the single-phase induction motor (12).

2. A method according to claim 1, further comprising the following steps:
   f) sampling, through the electronic start device (15), a second voltage signal (Vsamp2) from the voltage source (F) to the motor (12) in running condition;
   g) comparing the second voltage signal (Vsamp2) sampled at step "f" with the first voltage reference (V1) and with the second reference (V2);
   h) determining, on the basis of the comparison of step "g", if the motor (12) is decelerated or in the non-running condition by total or partial interruption of feed supplied by the voltage source (F);
   i) if the motor (12) is in non-running condition and the voltage source (F) is supplying feed energy, then carry out steps "a" to "e".

3. A method according to claim 2, wherein the electronic start device (15) is kept in an energy-saving mode if the first and the second voltage signals (Vsamp1, Vsamp2) are between the first and the second voltage references (V1, V2).

4. A method according to claim 1, wherein the first and the second voltage references (V1, V2) are pre-adjusted in a minimum operation condition (OPmin) capable of keeping the level of electric voltage from a direct-current source (8) inside the starting device (15).

5. A method according to claim 4, wherein the minimum operation condition (OPmin) is established so that the first and the second voltage signals (Vsamp1, Vsamp2) will be equaled to the first voltage reference (V1) or to the second voltage reference (V2) only if the voltage source (F) supplies an electric voltage capable of keeping the level of voltage of the direct-current source (8).

6. A method according to claim 1, wherein the start period of the motor (12) is calculated from a source frequency (Freqf) of the voltage source (F).

7. A start and control system for a single-phase induction motor (12), the motor (12) comprising a run winding (10) and a start winding (11), the start winding (11) being electrically associated to an electronic start device (15), the run winding (10) and the electronic start device (15) being electrically associated to an alternating-voltage (F) configured to supply feed energy to the motor (12), wherein
   the electronic start device (15) comprises a sensor element (7), the sensor element (7) being configured to sample a first voltage signal (Vsamp1) from the alternating voltage source (F) in a non-running condition,
   the system being configured to energize the start winding (11) through the electronic start device (15) if the first voltage signal (Vsamp1) is lower than or equal to a first voltage reference (V1), or higher than or equal to a second voltage reference (V2), the first voltage reference (V1) and the second voltage reference (V2) being pre-adjusted in the start device (15),
   the system further being configured to initiate a start period of the motor (12) through the electronic start device (15) and to count a start time (Tp) of the motor (12),
   the system de-energizing the start winding (11) through the electronic start device (15) if the start time (Tp) reaches a pre-established start time value (Tpest) so as to finish the start period of the motor (12).

8. A system according to claim 7, wherein the first and the second voltage references (V1, V2) are pre-adjusted at the electronic start device (15) through a signal processing unit (9).

9. A system according to claim 8, wherein the start winding (11) is de-energized after the start period has passed, this period being pre-established as a start time (Tpest) at the signal processing unit (9).

10. A system according to claim 8, wherein the signal processing unit (9) is fed by a direct-current source (8), and wherein the direct-current source (8) is connected in parallel to a start switch (S1).

11. A system according to claim 10, wherein the start switch (S1) commands the energizing of the start winding (11) through an electric command generated by the signal processing unit (9).

12. A system according to claim 7, wherein the system is configured to further sample, through the sensor element (7), a second voltage signal (Vsamp2) from the voltage source (F) to the motor (12) in running condition, so as to determine if said motor (12) is decelerated or turned off.

13. A system according to claim 7, wherein the signal processing unit (9) is fed by a direct-current source (8) that is connected in parallel to a start switch (S1), and wherein the start switch (S1) commands the energizing of the start winding (11) through an electric command generated by the signal processing unit (9).

14. An electronic start device (15) applied to a single-phase induction motor (12), fed by a voltage source (F), the device (15) comprising at least one start switch (S1) electrically associated to a start winding (11) of the motor (12), the electronic start device (15) being configured to sample a first voltage signal (Vsamp1) from the alternating voltage source (F) in a non-running condition, the electronic device (15) being further configured to command the start switch (S1) so as to energize the start winding (11) if a first voltage signal (Vsamp1) is lower than or equal to a first voltage reference (V1), or higher than or equal to a second voltage reference (V2), the first voltage reference (V1) and the second voltage reference (V2) being pre-adjusted in the start device (15), the electronic start device (15) being configured to initiate a start period of the motor (12) and to count a start time (Tp) of the motor (12), the electronic start device (15) further de-energizing the start winding (11) if the start time (Tp) reaches a pre-established start time value (Tpest) so as to finish the start period of the motor (12).

15. A device according to claim 14, further comprising at least one signal processing unit (9), fed by a direct-current source (8), and at least one sensor element (7) configured to measure the first and the second voltage signals (Vsamp1, Vsamp2).

* * * * *